(12) United States Patent
Rykaczewski et al.

(10) Patent No.: US 10,451,494 B2
(45) Date of Patent: Oct. 22, 2019

(54) METHODS OF RAPID 3D NANO/MICROFABRICATION OF MULTIFUNCTIONAL SHELL-STABILIZED LIQUID METAL PIPE NETWORKS AND INSULATING/METAL LIQUIDS ELECTRO-MECHANICAL SWITCH AND CAPACITIVE STRAIN SENSOR

(71) Applicant: Arizona Board of Regents on behalf of Arizona State University, Scottsdale, AZ (US)

(72) Inventors: Konrad Rykaczewski, Tempe, AZ (US); Kyle Doudrick, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 127 days.

(21) Appl. No.: 15/302,229

(22) PCT Filed: May 15, 2015

(86) PCT No.: PCT/US2015/031174
§ 371 (c)(1),
(2) Date: Oct. 6, 2016

(87) PCT Pub. No.: WO2015/175989
PCT Pub. Date: Nov. 19, 2015

(65) Prior Publication Data
US 2017/0089774 A1     Mar. 30, 2017

Related U.S. Application Data

(60) Provisional application No. 61/994,442, filed on May 16, 2014.

(51) Int. Cl.
*G01L 1/14*      (2006.01)
*B33Y 70/00*   (2015.01)
(Continued)

(52) U.S. Cl.
CPC ............... *G01L 1/144* (2013.01); *B05B 1/30* (2013.01); *B33Y 10/00* (2014.12); *B33Y 70/00* (2014.12); *H01H 29/06* (2013.01)

(58) Field of Classification Search
CPC .......... H01H 29/00; H01H 1/00; H01H 29/06; G01L 1/144; G01L 1/142; B33Y 10/00; B33Y 70/00; B05B 1/30
(Continued)

(56) References Cited

U.S. PATENT DOCUMENTS

| 5,292,472 A | 3/1994 | Tompkins et al. |
| 5,486,676 A | 1/1996 | Stephen et al. |

(Continued)

FOREIGN PATENT DOCUMENTS

EP      1291160 A2     3/2003

OTHER PUBLICATIONS

International Search Report for PCT/US2015/031174, dated Nov. 11, 2015.

*Primary Examiner* — Octavia Hollington
(74) *Attorney, Agent, or Firm* — Fish & Richardson P.C.

(57) ABSTRACT

An electronic switch apparatus, a capacitive strain gauge apparatus and a nozzle apparatus, as well as methods for making electrodes such as liquid metal pipes are provided. A nozzle apparatus includes (a) a nozzle housing defining a cavity, where the nozzle housing defines an inlet at a first end and defines an outlet at a second end and (b) a first tube defining an inlet at a first end and defining an outlet at a second end, wherein the first tube is at least partially disposed in and is co-axially arranged with the nozzle housing, where the first tube defines a first flow channel, wherein a second flow channel is defined between an exterior surface of the first tube and an interior surface of the nozzle housing.

15 Claims, 12 Drawing Sheets

(51) Int. Cl.
*B33Y 10/00* (2015.01)
*B05B 1/30* (2006.01)
*H01H 29/06* (2006.01)

(58) Field of Classification Search
USPC .......................................................... 73/780
See application file for complete search history.

(56) References Cited

U.S. PATENT DOCUMENTS

| | | | | |
|---|---|---|---|---|
| 6,891,116 B2* | 5/2005 | Dove | ................... | H01H 29/28 |
| | | | | 200/182 |
| 7,022,926 B2* | 4/2006 | Wong | ................... | H01H 1/0036 |
| | | | | 200/182 |
| 7,071,432 B2* | 7/2006 | Lindsey | ................. | G02B 6/353 |
| | | | | 200/182 |
| 2005/0056628 A1 | 3/2005 | Hu et al. | | |
| 2005/0230498 A1 | 10/2005 | Ruediiger et al. | | |

* cited by examiner

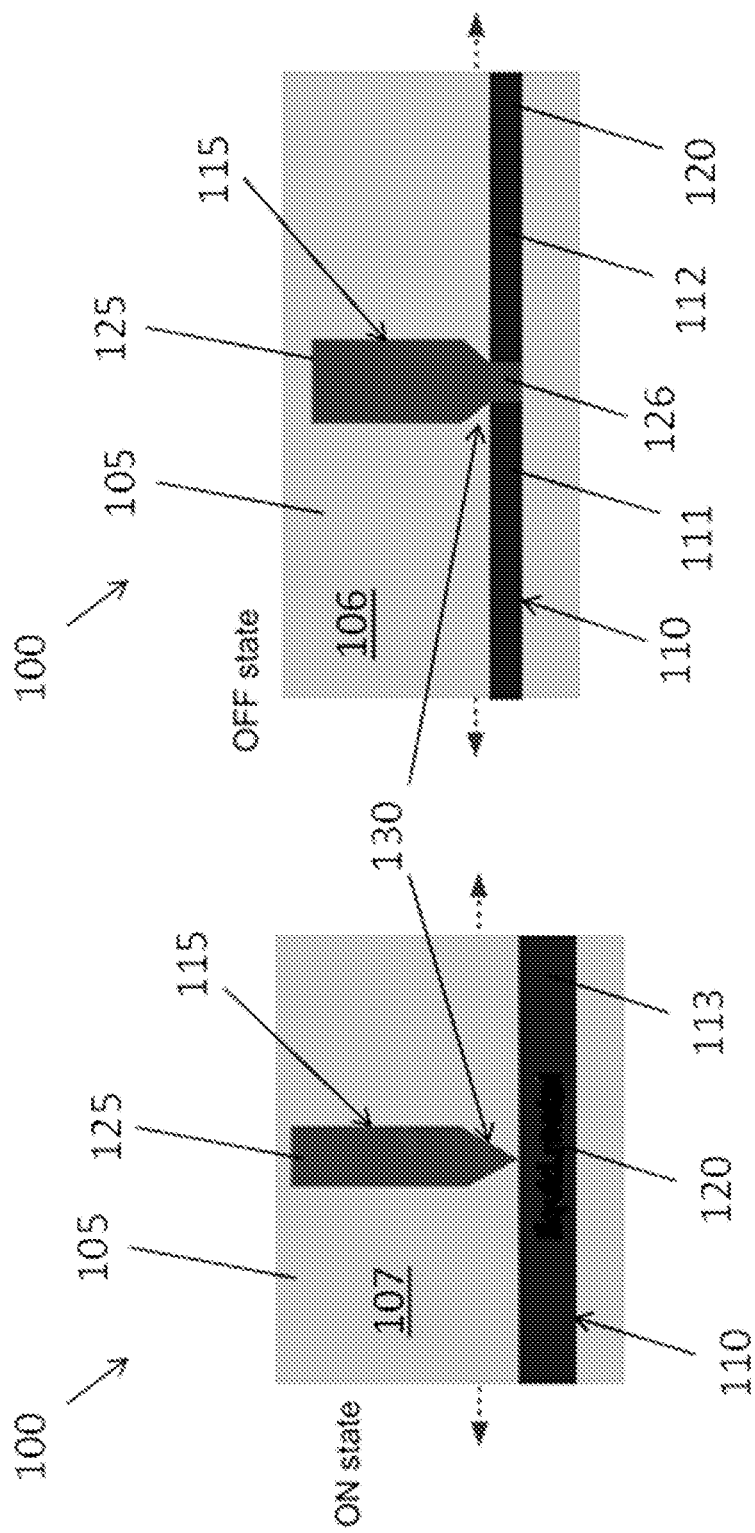

METHODS OF RAPID 3D NANO/MICROFABRICATION OF MULTIFUNCTIONAL SHELL-STABILIZED LIQUID METAL PIPE NETWORKS AND INSULATING/METAL LIQUIDS ELECTRO-MECHANICAL SWITCH AND CAPACITIVE STRAIN SENSOR

CROSS-REFERENCE TO RELATED APPLICATIONS

This application is a U.S. National Phase of International Application No. PCT/US2015/031174, filed May 15, 2015, which claims priority to U.S. Provisional Application No. 61/994,442, filed May 16, 2014, the disclosures of which are hereby incorporated by reference in their entireties.

BACKGROUND OF THE INVENTION

Stretchable electronic components have applications in flexible electronics, biomedical devices, and soft robotics. Room-temperature liquid metals may be attractive materials for fabrication of such devices because they retain their functionality even when stretched to several times their original length. One of the earliest examples of liquid-phase electronics is the Whitney strain gauge. This device measures strain of a mercury-filled rubber tube by measuring change in electric resistance of the metal. While in the past two decades mercury and rubber have been replaced by nontoxic liquid gallium alloys (i.e., GaIn and GaInSn) and more elastic polydiemethylsiloxane ("PDMS"), the resistive design of the liquid metal strain sensor remains popular. These resistive devices have a large footprint that may restrict the number of sensors that may be embedded into, for example, electronic fabric or skin. For example a ~1Ω resistor made out of GaInSn with resistivity of 0.29 µΩm in a 200 µm diameter channel typically has a length of ~10 cm. By winding the channel 10 times such a sensor may fit into an area of ~1 cm$^2$.

Improved understanding of the GaIn and GaInSn wetting characteristics and advances in their micro-fabrication may enable fabrication of smaller liquid metal filled microchannels with higher areal density; however, the serpentine geometry of these resistors remains quite complex. Several designs of capacitive strain sensors have been proposed as alternatives to the resistive devices. These capacitive devices consist of two microchannels filled with liquid metal separated by solid dielectric PDMS matrix. For in-plane sensing an order of magnitude estimate for the required sensor footprint can be obtained using the parallel plate capacitor model, $C \approx \varepsilon_0 \varepsilon_A / d$ (i.e., $A \approx Cd/\varepsilon_0 \varepsilon$). To achieve a capacitance (C) of ~1 pF, two liquid metal-filled microchannels with both height (h) and separation (d) of ~400 µm within a PDMS matrix ($\varepsilon \sim 2$) typically have a length of 1~10 cm (from the conductor-dielectric interfacial area, A~1 h~4×10$^{-5}$ m$^2$). By winding the parallel channels in a serpentine arrangement, such a sensor may fit into a base area of several square centimeters. Such a base area is typically needed for a variety of winding two-channel capacitive strain sensor designs to achieve C~1-15 pF. With such a large footprint the sensor output is affected by stretching in multiple directions, not only in the desired principle direction. As a result, correlation of the physical strain with the sensor output is complex.

SUMMARY OF THE INVENTION

Example embodiments provide an electronic switch apparatus, a capacitive strain gauge apparatus and a nozzle apparatus and methods for making liquid metal pipes. Specifically, in example embodiments, the electronic switch apparatus and capacitive strain gauge apparatus may advantageously utilize smaller microchannels and/or an insulator material having a higher dielectric constant ($\varepsilon$) permitting a smaller footprint of these devices than sensors known in the alt. In other example embodiments, dielectric liquids may be used in place of solid elastomers, like PDMS, in the electronic switch apparatus and/or capacitive strain gauge apparatus and may beneficially decrease the required conductor-dielectric interfacial area of the electronic switch or capacitive strain gauge apparatus by 20 to 40 times compared to sensors known in the art.

In other example embodiments, the nozzle apparatus and methods of use may advantageously permit production of liquid metal pipes. Example embodiments of the nozzle apparatus and methods of use may permit formation of shells of the liquid metal pipes with different mechanical, chemical, electrical, and thermal properties and functions. Thus the choice of one or more fluids flowing through the nozzle apparatus may be tailored to the specific functionality desired for the shell material/surface, while at the same time enabling free liquid metal flow inside the liquid metal pipe. This may have the advantage of allowing rapid 3D nano- or micro-fabrication of liquid metal networks for a variety of applications. 3D printed liquid metal pipe networks may be functional on their own or may serve as the conductive skeleton for encapsulation in a flexible polymer matrix, for example, for use in the electronic switch apparatus and/or the capacitive strain gauge apparatus.

Thus, in one aspect, an electric switch apparatus is provided having (a) a base comprising a first channel and a second channel, (b) an electrode disposed in the first channel, wherein the electrode comprises a cavity and a liquid metal disposed in the cavity and (c) an electrically insulating liquid at least partially disposed in the second channel, where in a strained condition a portion of the electrically insulating liquid extends into the first channel dividing the electrode into at least two electrically isolated chambers within the first channel, and where in an unstrained condition the cavity of the electrode is undivided.

In a second aspect, an electric switch apparatus is provided having (a) a base comprising one or more channels, (b) an electrode disposed in at least one of the one or more channels, wherein the electrode comprises a cavity and a liquid metal disposed in the cavity and (c) a strain dependent gate defined by opposing walls of the channel, where in a strained condition the strain-dependent gate maintains an open position such that the cavity of the electrode is undivided, and where in an unstrained condition the strain-dependent gate maintains a closed position dividing the electrode into at least two electrically isolated chambers.

In a third aspect, a capacitive strain gauge apparatus is provided having (a) a base defining a channel having a first end and a second end, (b) a first electrode disposed in the first end of the channel, where the first electrode comprises a first cavity and a first liquid metal disposed in the first cavity, (e) a second electrode disposed in the second end of the channel, where the second electrode comprises a second cavity and a second liquid metal disposed in the second cavity and (d) an insulating liquid arranged between the first electrode and the second electrode.

In a fourth aspect, a nozzle apparatus is provided having (a) a nozzle housing defining a cavity, where the nozzle housing defines an inlet at a first end and defines an outlet at a second end and (b) a first tube defining an inlet at a first end and defining an outlet at a second end, wherein the first tube is at least partially disposed in and is co-axially arranged with the nozzle housing, where the first tube defines a first flow channel, wherein a second flow channel is defined between an exterior surface of the first tube and an interior surface of the nozzle housing.

In a fifth aspect, a method is provided including the steps of (a) flowing a liquid metal through a first flow channel to a first outlet, (b) flowing a first fluid through a second flow channel to a second outlet surrounding the first outlet and (c) upon exiting the respective first outlet or second outlet, reacting the first fluid with the flowing liquid metal, creating an exterior shell on the liquid metal.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 1A is a top view of one example embodiment of an electric switch apparatus in an unstrained condition according to a first aspect of the invention.

FIG. 1B is a top view of the example embodiment of FIG. 1A in a strained condition.

DETAILED DESCRIPTION

Figure 2A:
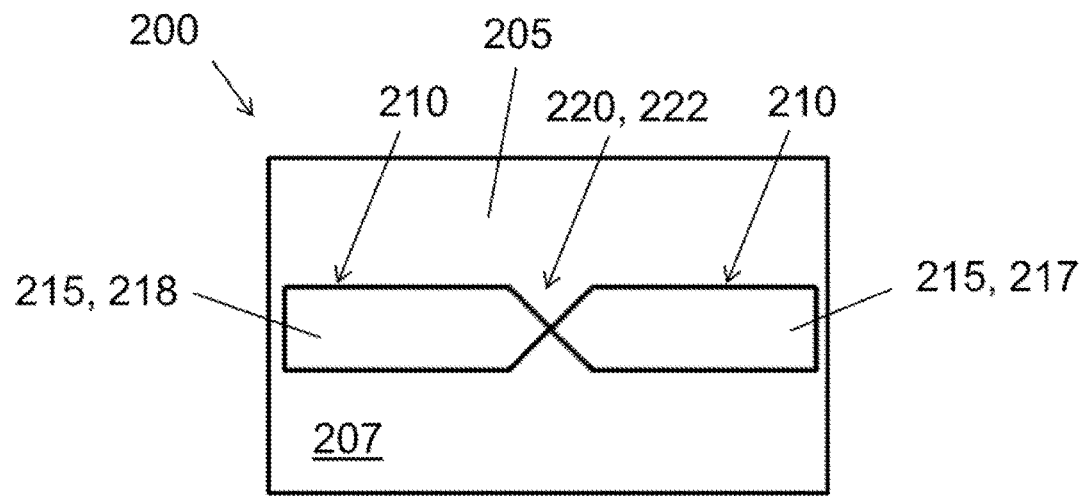
FIG. 2A is a top view of one example embodiment of an electric switch apparatus in an unstrained condition according to a second aspect of the invention.

Example embodiments of an electronic switch apparatus, a capacitive strain gauge apparatus and a nozzle apparatus and methods for making liquid metal pipes are described herein. Any example embodiment or feature described herein is not necessarily to be construed as preferred or advantageous over other embodiments or features. The example embodiments described herein are not meant to be limiting. It will be readily understood that certain aspects of the disclosed apparatus and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

As used herein, a "capacitive strain gauge" refers to an apparatus configured to measure strain in an object of interest. In operation, the capacitive strain gauge may be attached to the object of interest and receives the same strain as that applied to the object of interest. The applied strain may then be measured by the change in the electrical properties of capacitive strain gauge due to deformation of the strain gauge.

As used herein, an "electric switch" refers to an apparatus configured to complete and to open an electric circuit depending upon whether the switch is in a strained or unstrained position.

As used herein, an "electrode" refers to an apparatus having a shell or surface layer that may reduce adhesion and flow of a liquid metal therein. The electrode shell or surface may include grown oxide, textured elastomer, oil infused elastomer, an interfacial lubricating liquid or combinations thereof.

As used herein, a "liquid metal pipe" or "metal pipe" refers to a pipe having an oxidized external shell surrounding a liquid metal. Other materials like a liquid or solid dielectric may be disposed within or injected into the pipe.

As used herein, a flexible polymer may include any polymer capable of stretching (i.e., having a low Young's modulus) and that acts as a dielectric, any suitable elastomer may be used, including but not limited to embodiments utilizing silicones, such as Polydimethylsiloxane ("PDMS") and ecoflex.

The present embodiments advantageously provide an electronic switch apparatus, a capacitive strain gauge apparatus and a nozzle apparatus and methods for making liquid metal pipes. Referring now to FIGS. 1A-B, an electronic switch apparatus 100 is shown having a base 105 that includes a first channel 110 and a second channel 115. In one embodiment, the base 105 may made of a flexible polymer as described above. in another embodiment, the first channel 110 and the second channel 115 may be arranged perpendicular to one another. An electrode 120 is disposed in the first channel 110. In one embodiment, the electrode may be a metal pipe 120 that comprises an oxidized external shell defining a cavity 113 and a liquid metal disposed in the cavity, best seen in FIG. 4. in various embodiments, the liquid metal may be a gallium-based liquid metal that includes one or more of GaIn, GaInSn or a gallium alloy, including eutectic gallium alloys which tend to be more stable with a lower freezing point. An electrically insulating liquid 125 is at least partially disposed in the second channel 115. The electrically insulating liquid 115 is arranged such that in a strained condition 106 (FIG. 1B) a portion 126 of the electrically insulating liquid 125 extends into the first channel 110 dividing the electrode 120 into at least two electrically isolated chambers 111, 112 within the first channel 110 and, in an unstrained condition 107 (FIG. 1A), the cavity 113 of the electrode 120 is undivided.

In one embodiment, the base 105 may include a strain-dependent gate 130 coupling the first channel 110 to the second channel 115, facilitating the electrically insulating liquid's movement between the unstrained 107 and strained 106 conditions. In one embodiment, the strain-dependent gate 130 may be biased closed in the unstrained position 107 and biased open in the strained condition 106.

Figure 2B:
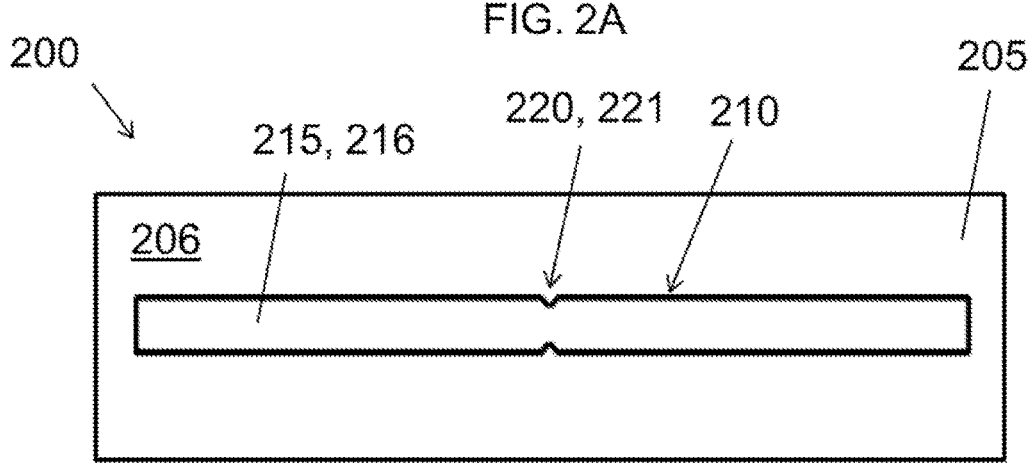
FIG. 2B is a top view of the example embodiment of FIG. 2A in a strained condition.

Referring now to FIGS. 2A-B, an electric switch apparatus 200 is shown having a base 205 that includes one or more channels 210. In one embodiment, the base 205 may be made of a flexible polymer as described above. An electrode 215 is disposed in at least one of the one or more channels 210. In one embodiment, the electrode may be a metal pipe 215 that comprises an oxidized external shell defining a cavity and a liquid metal disposed in the cavity, best seen in FIG. 4. In various embodiments, the liquid metal may include a gallium-based liquid metal that includes one or more of GaIn, GaInSn or a gallium alloy, including eutectic gallium alloys which tend to be more stable having lower freezing points. The electric switch apparatus also includes a strain dependent 220 gate defined by opposing walls of the channel 210. In a strained condition 206 the strain-dependent gate 220 maintains an open position 221 such that the cavity 216 of the electrode 215 is undivided, and in an unstrained condition 207 the strain-dependent gate 220 maintains a closed position 222 dividing the electrode 215 into at least two electrically isolated chambers 217, 218.

Figure 3A:
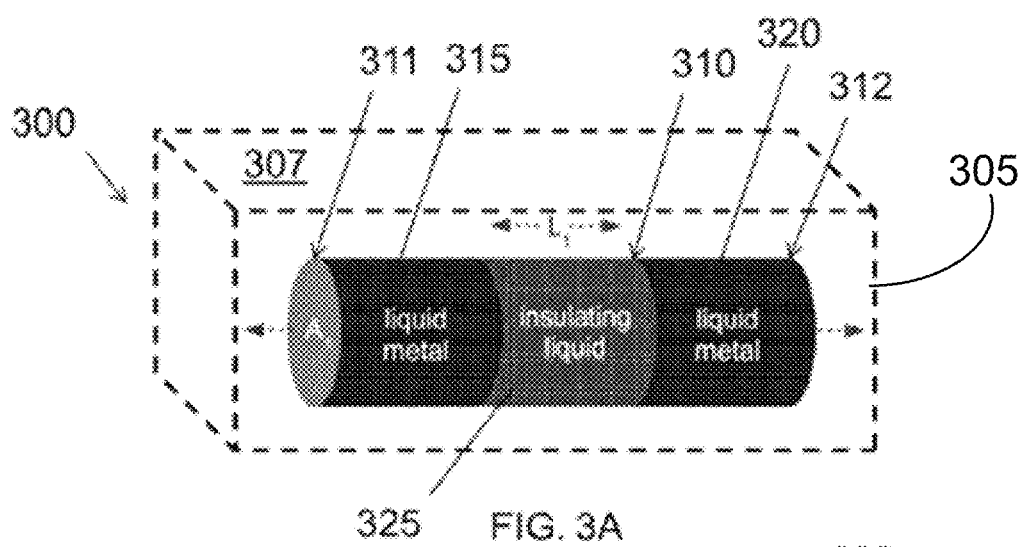
FIG. 3A is a perspective view of one example embodiment of a capacitive strain gauge apparatus in an unstrained condition according to a third aspect of the invention.
Figure 3B:
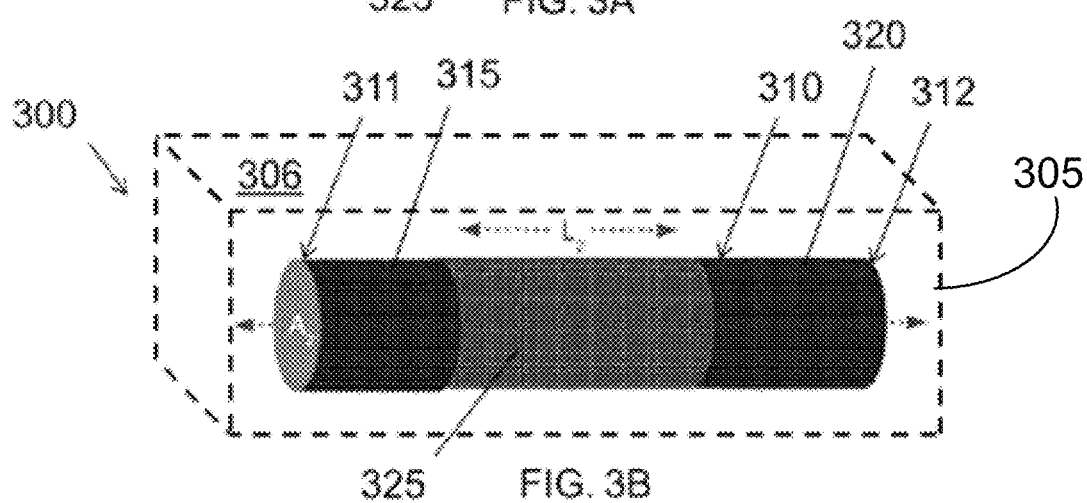
FIG. 3B is a top view of the example embodiment of FIG. 3A in a strained condition.

Referring now to FIGS. 3A-B, a capacitive strain gauge apparatus 300 is shown having a base 305 defining a channel 310 having a first end 311 and a second end 312. In one embodiment, the base may be a flexible polymer, as described above. A first electrode 315 is disposed in the first end 311 of the channel 310. In one embodiment, the first electrode may be a first metal pipe 315 that includes an oxidized external shell defining a first cavity and a first liquid metal disposed in the first cavity, best seen in FIG. 4. An second electrode pipe 320 is disposed in the second end 312 of the channel 310. In one embodiment, the second electrode may be a second metal pipe 320 likewise includes an oxidized external shell defining a second cavity and a second liquid metal disposed in the second cavity. The capacitive strain gauge apparatus 300 further includes an insulating liquid 325 arranged between the first electrode 315 and the second electrode 320. In one embodiment, the insulating liquid may be a dielectric, including glycerol or water, or combinations thereof. In various embodiments, the insulating liquid may have a dielectric constant ($\varepsilon$) greater than 2 and in further embodiments may have a dielectric constant ($\varepsilon$) greater than about 40. In one embodiment, the first electrode 315, the second electrode 320 and the insulating liquid 325 may be configured to have a capacitance greater than about 5 pF.

In one embodiment, in an unstrained condition 307 the channel 310 may have a first length L1 and a first cross-sectional area $A_1$, and in a strained condition 306 the channel 310 may have a second length $L_2$ greater than first length $L_1$ and a second cross-sectional area $A_2$ less than first cross-sectional area $A_1$. In other words, the base 305, and thereby the channel 310 and the first and second electrodes 315, 320, are elongated in the strained condition. In a further embodiment, the base 305 may have a surface area ranging from about 0.1 mm² to about 10 mm².

Figure 9:
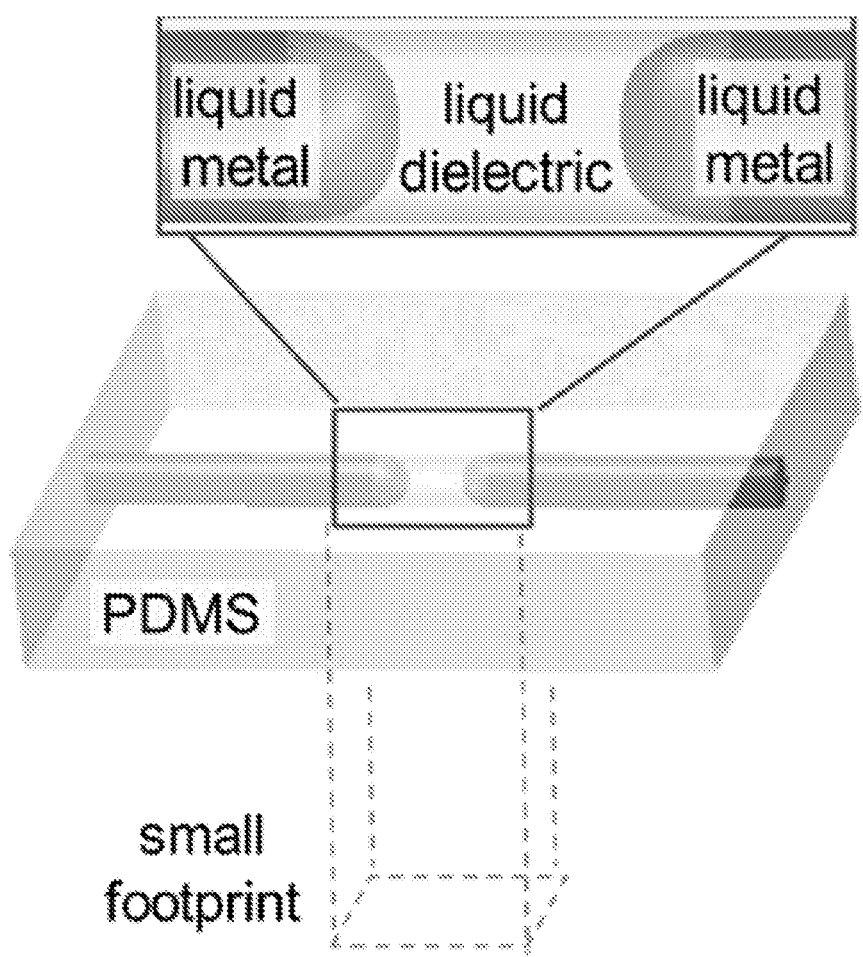
FIG. 9 shows a single channel filled with liquid metal and a liquid dielectric material.

In another embodiment, in which the electrodes are metal pipes, the first metal pipe 315 and the second metal pipe 320 may each have one of a flat end (FIGS. 3A-B) or a meniscus (e.g., FIGS. 9, 11) at an interface with the insulating liquid 325. In a further embodiment, each meniscus may have a contact angle measured from a line connecting edges of the respective metal pipe and ranging from 0 degrees to about 90 degrees (e.g., FIG. 11). The effect of the contact angle of the meniscus on capacitance is discussed in Example 2 below.

Figure 11:
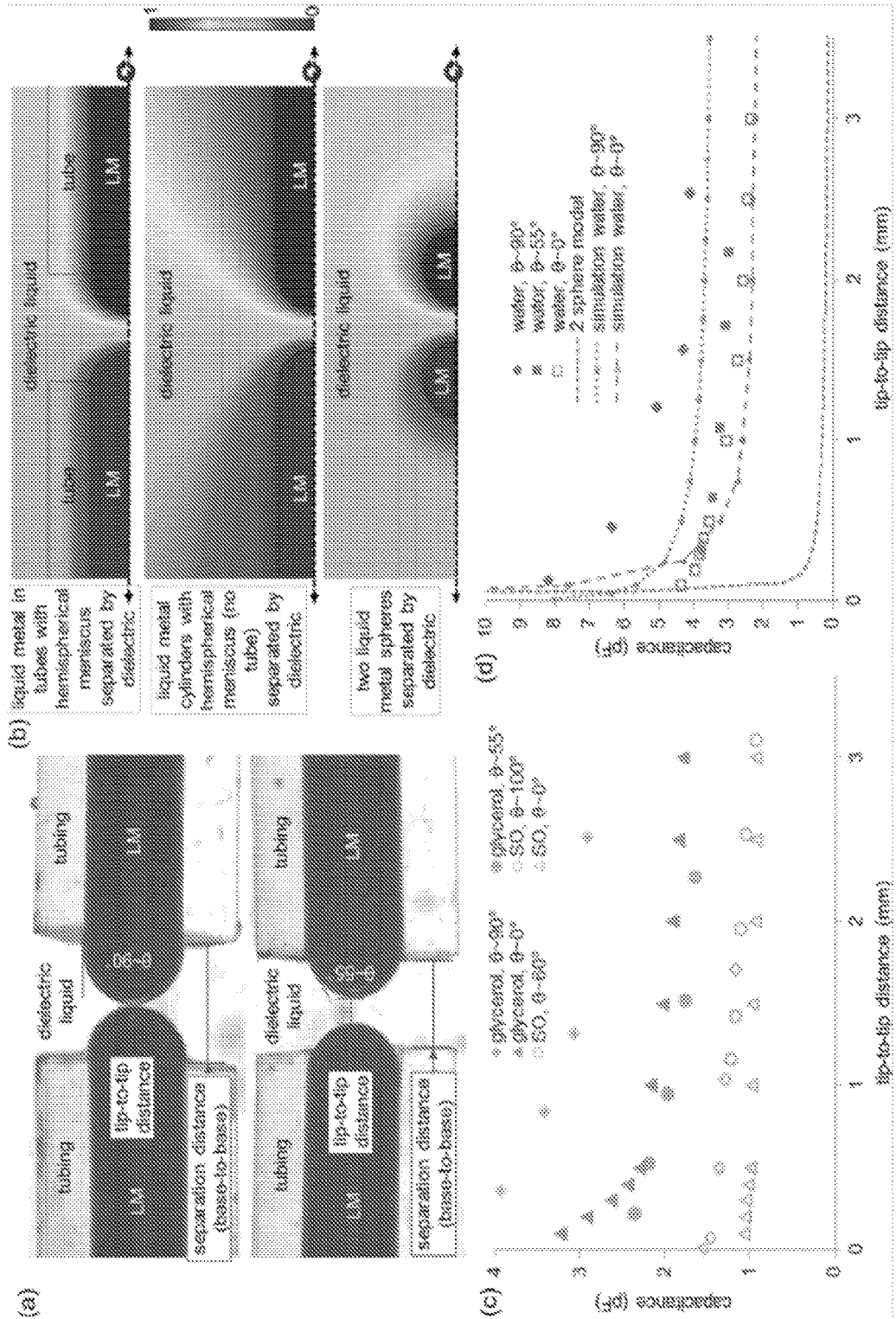
FIG. 11(a) shows sample images of two-liquid capacitors with meniscus-ended electrodes with θ~60° and θ~90°.
FIG. 11(b) shows an example of simulated potential fields around the capacitors consisting of hemisphere-ended cylinders with and without tubing as well as two spheres.
FIG. 11(c) plots of measured capacitance of two symmetrical meniscus-ended electrodes separated by glycerol and silicone oil.
FIG. 11(d) water as a function of separation distances (base-to-base) and tip-to-tip separation distances defined in FIG. 11(a).

In another embodiment, in which the electrodes are metal pipes, a tip-to-tip distance between the first metal pipe 315 and the second metal pipe 320 measured across the insulating liquid 325 may range from about 100 nm to about 10 mm (e.g., FIG. 11). The effect of tip-to-tip distance on capacitance is discussed below in Example 2.

Figure 4:
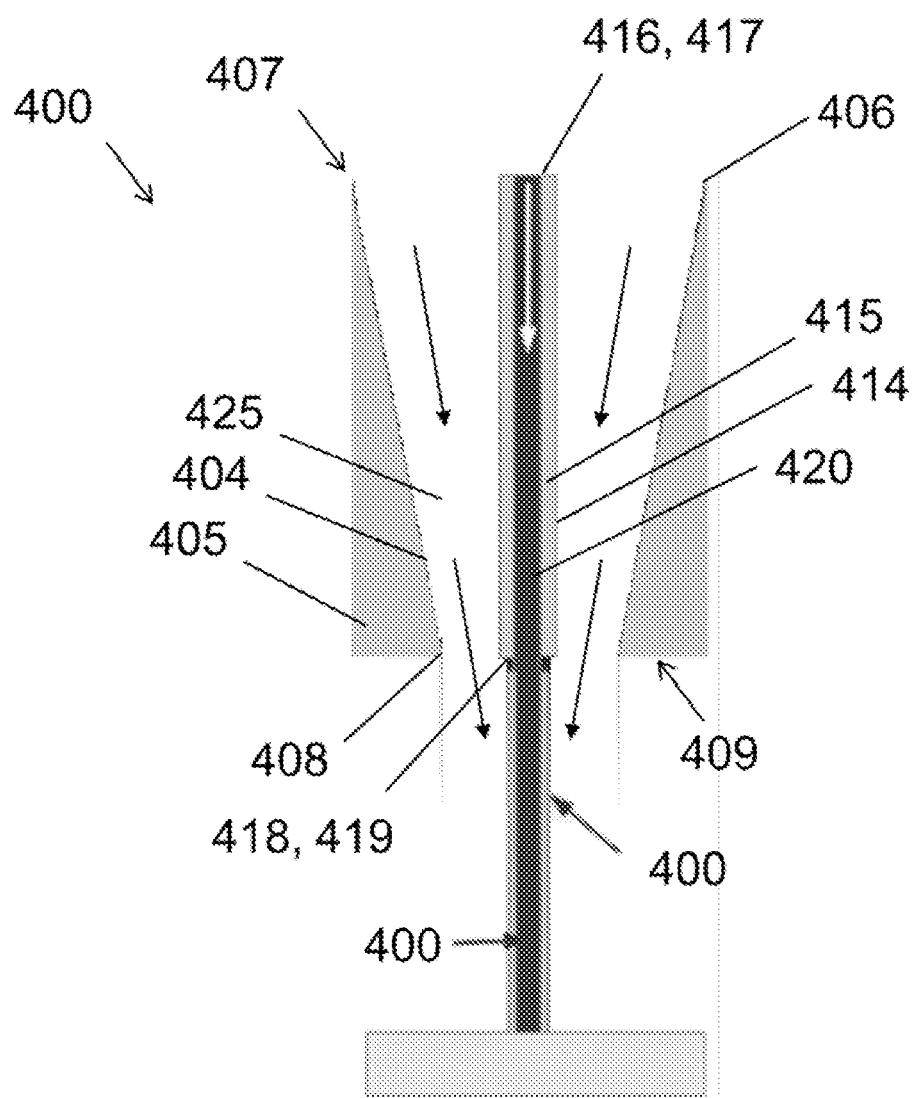
FIG. 4 is a side cross-sectional view of one example embodiment of a nozzle apparatus according to a fourth aspect of the invention and a liquid metal pipe.
Figure 6:
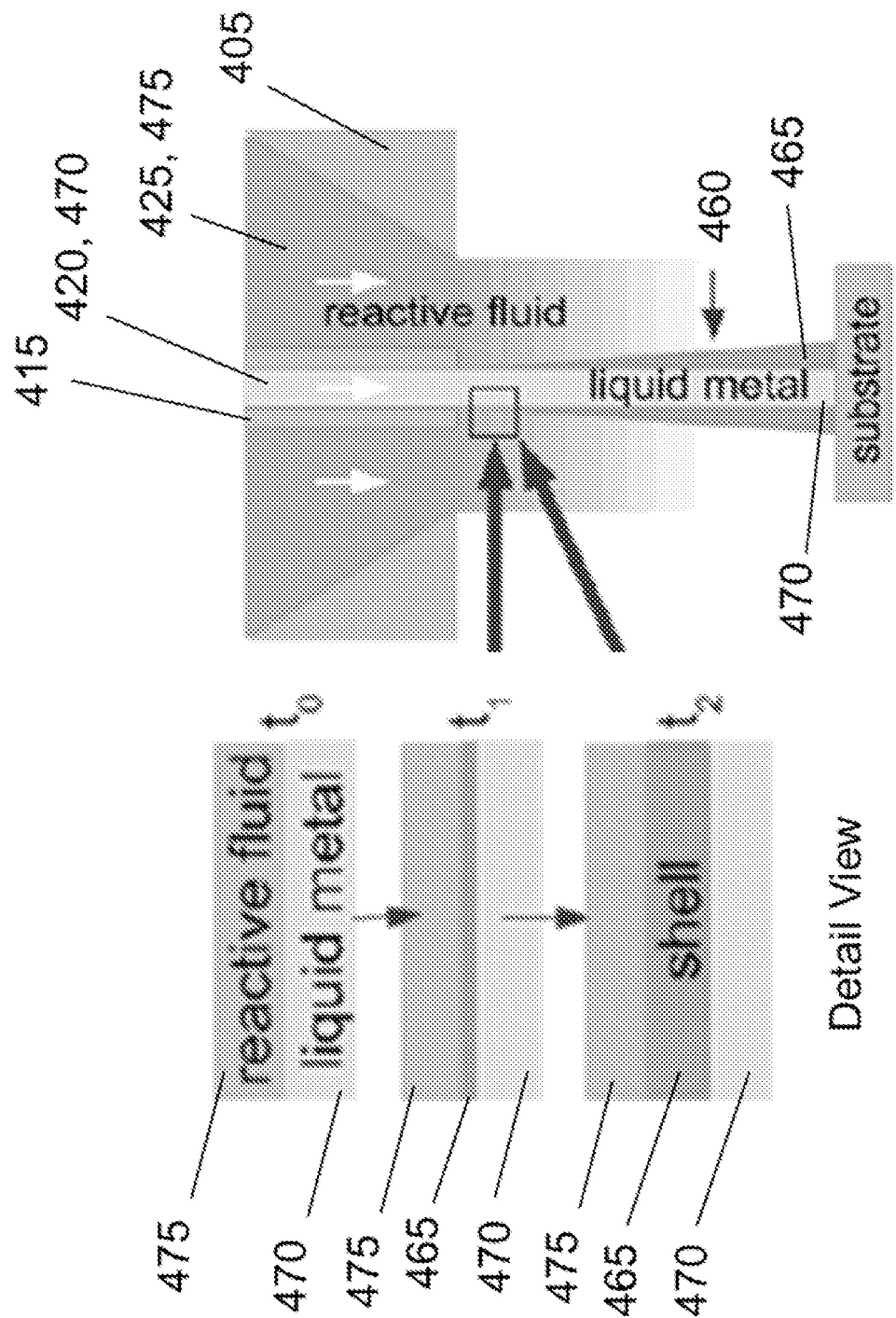
FIG. 6 is a detail view of the shell of the liquid metal pipe formed over time by one example embodiment of the nozzle apparatus.

Referring now to FIGS. 4 and 6, a nozzle apparatus 400 is shown including a nozzle housing 405 defining a cavity 410. The nozzle housing 405 defines an inlet 406 at a first end 407 and defines an outlet 408 at a second end 409. The nozzle apparatus 400 also includes a first tube 415 defining an inlet 416 at a first end 417 and defining an outlet 418 at a second end 419. The first tube 415 is at least partially disposed in and is co-axially arranged with the nozzle housing 405 such that the first tube 415 defines a first flow channel 420 and a second flow channel 425 is defined between an exterior surface 414 of the first tube 415 and an interior surface 404 of the nozzle housing 405.

Figure 5:
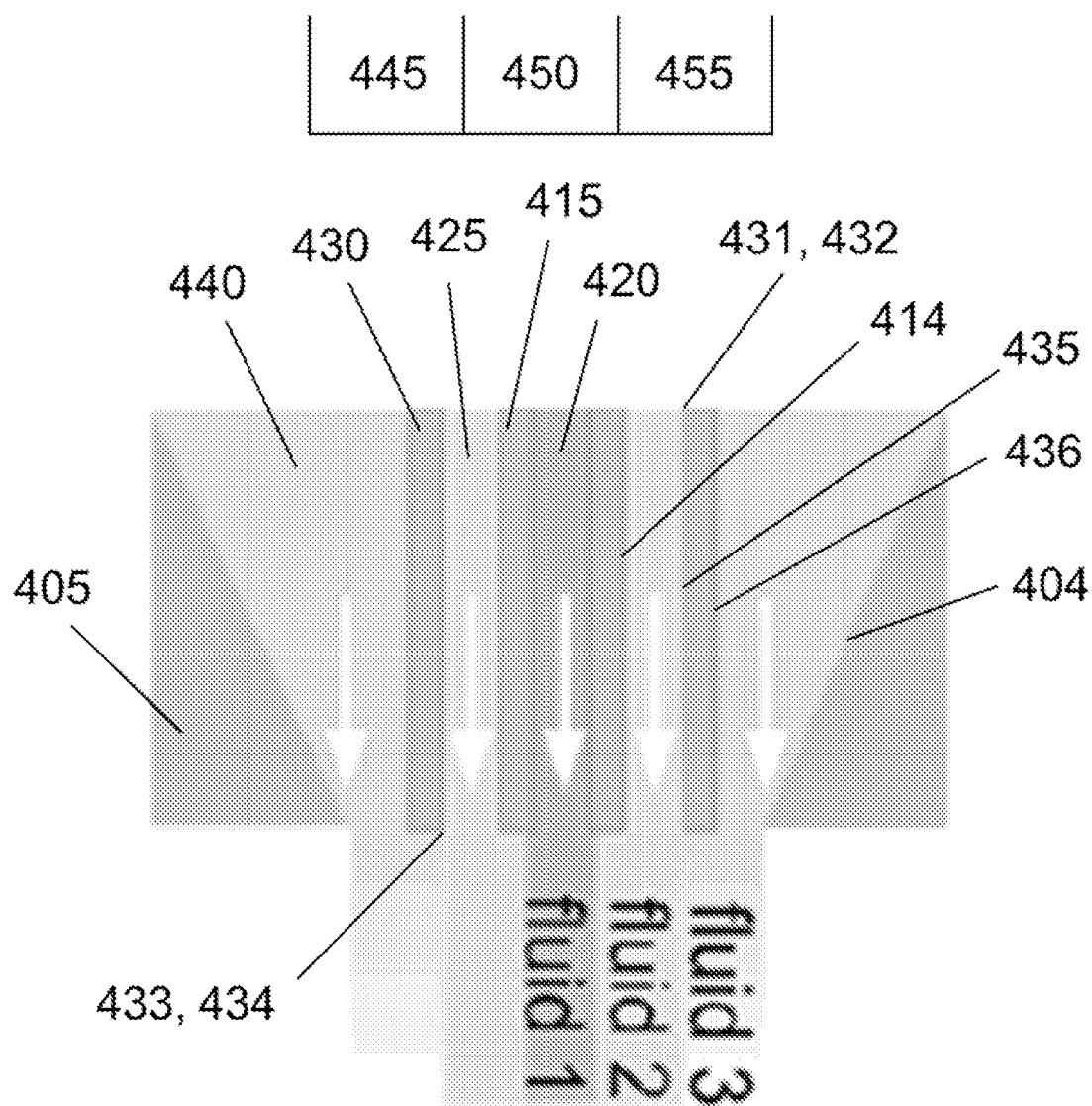
FIG. 5 is a side cross-sectional view of a second example embodiment of a nozzle apparatus according to the fourth aspect of the invention.

In one embodiment, as shown in FIGS. 4-6, the interior surface 404 of the second end 409 of the nozzle lousing 405 tapers inward towards the first tube 415. In operation, this taper may help direct a fluid flowing in and exiting from the second flow channel toward a fluid flowing in and exiting from the first flow channel to facilitate interaction between the two fluids.

In another embodiment, the second end 419 of the first tube 415 may be coextensive with the second end 409 of the nozzle housing 405 such that the outlet 418 of the first tube 415 is arranged within the outlet 408 of the nozzle housing 405, as shown in FIGS. 4-6. In one alternative embodiment, the second end 419 of the first tube 415 may extend beyond the second end 409 of the nozzle housing 405 (not shown). In another alternative embodiment, the second end 409 of the nozzle housing 405 may extend beyond the second end 419 of the first tube 415 such that the outlet 418 of the first tube 415 is arranged within the nozzle housing 405 (not shown).

In a further embodiment, shown in FIG. 5, the nozzle apparatus 400 may also include a second tube 430 defining an inlet 431 at a first end 432 and defining an outlet 433 at a second end 434. The second tube 430 may be at least partially disposed in and is co-axially arranged with the nozzle housing 405, and the first tube 415 may be at least partially disposed in and coaxially arranged with the second tube 430. The second flow channel 425 may be further defined between an interior surface 435 of the second tube 430 and the exterior surface 414 of the first tube. And a third flow channel 440 may be defined between the interior surface 404 of the nozzle housing 405 and an exterior surface 436 of the second tube 430.

In still another embodiment, the nozzle apparatus 400 may also include a liquid reservoir arranged in fluid communication with the first flow channel 415 and a first fluid chamber arranged in fluid communication with the second flow channel 425 (not shown). This arrangement may permit the formation of a metal pipe 460 having an exterior oxide shell 465 and defining a cavity in which liquid metal 470 is disposed, as described in further detail below. In an alternative embodiment, shown in FIG. 5, the first fluid chamber 445 may be in fluid communication with the first flow channel 415, the liquid metal reservoir 450 may be in fluid communication with the second flow channel 425 and a second fluid chamber 455 may be in fluid communication with the third flow channel 440. This arrangement may permit formation of metal pipe having an annular structure with an exterior oxide shell, an interior oxide shell and a cavity defined there between in which liquid metal is disposed.

As illustrated in FIG. 6, a method is provided that includes flowing a liquid metal 470 through a first flow channel 420 to a first outlet 418. In various embodiments, the first fluid may include one of an HCl vapor, air, oxygen, ozone, chlorinated gas, nitrous oxide, fluorinated gas, brominated gas, flame retardants non-binding polymers, a liquid with an oxide binding polymer, an electrolyte liquid with an imposed voltage or combinations thereof. In addition, a first fluid 475 flows through a second flow channel 425 to a second outlet 408 surrounding the first outlet 418. Upon exiting the respective first outlet 418 or second outlet 408, the first fluid 475 is reacted with the flowing liquid metal 470, creating an exterior shell 465 on the liquid metal 470.

In various embodiments, the exterior shell 465 may include solid oxide, solid chloride, solid nitride or a polymer.

The foregoing method may induce complex surface dynamics on the liquid metal based upon the momentum ratio of the flow of the liquid metal and first fluid, the ratio of inertial to surface tension forces (Weber number), the ratio of inertial to viscous forces (Reynolds number), and the density and viscosity ratios of the liquid metal and the first fluid, for example. These factors may include Rayleigh-Plateau instabilities of the central liquid metal flow (i.e., small first fluid to liquid metal momentum ratio) and shear driven Kelvin-Helmholtz-type and Rayleigh-Taylor instabilities (i.e., large first fluid to liquid metal momentum ratio). Similar dynamics may occur in triple-orifice co-flow nozzles, discussed below and shown in FIG. 5.

In one embodiment, the liquid metal 470 may be shaped via at least the first fluid 475, upon exiting the respective first outlet 418 or second outlet 408. In a further embodiment, the liquid metal may be shaped by focusing the flowing liquid metal 470 to a diameter smaller than a diameter of the first flow channel 420, which may be further achieved by adjusting the flow rate and/or pressure of the first fluid 475 or adjusting the position of the first outlet 418 relative to the second outlet 408, for example. In operation, in one embodiment, the thickness of the exterior shell 465 may increase with an increase in the amount of time that the exterior shell 465 is exposed to the first fluid. An example of this is shown in the detail view of FIG. 6. Specifically, the first fluid 475 contacts the liquid metal at $t_0$, an exterior shell 465 forms due to a reaction between the first fluid 475 and the liquid metal 470 at $t_1$ and the exterior shell 465 thickens with continued exposure to the flow of the first fluid 475 at $t_2$. The first fluid 475 may also be used to determine other mechanical, chemical, electrical, and thermal properties or functions of the exterior shell 465.

In yet another embodiment, the method may further include flowing a second fluid through a third flow channel to a third outlet (e.g., FIG. 5). In a further embodiment, upon exiting the third outlet, the second fluid may be reacted with one of the exterior shell 465 or the flowing liquid metal 470. In one embodiment, the third outlet surrounds the first outlet such that the second fluid is reacted with the exterior shell 465 formed through reaction with the first fluid. The second fluid may thereby cause the oxide shell 465 to have an increased thickness or different mechanical, chemical, electrical, and thermal properties or functions. For example, a layer may be created on the exterior shell 465 on the liquid metal 470 via the second fluid. Alternatively, the first outlet may surround the third outlet and the second fluid may be reacted with the flowing liquid metal, upon exiting the third outlet. In one embodiment, when the second fluid is reacted with the liquid metal, this may create an interior shell within the liquid metal. This configuration may permit direct fabrication of annular-cross-section structures shaped through hydrodynamic interactions.

In yet another embodiment, the method may include depositing a portion of the liquid metal on a substrate, upon exiting the first outlet. In various embodiments, the substrate may be silicon, PTFE, PDMS, tungsten or glass.

The method may be performed using any of the embodiments of the nozzle apparatus 400 described above. The above detailed description describes various features and functions of the disclosed electric switch apparatus, capacitor strain gauge apparatus, nozzle apparatus and methods of use of the nozzle apparatus with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Example 1: Methods of Rapid 3D Nano/Microfabrication of Multifunctional Shell-Stabilized Liquid Metal Pipe Networks and Insulating/Metal Liquids Electro-Mechanical Switch and Capacitive Strain Sensor This example describes use of a co-flow nozzle for rapid 3D nano/microfabrication of multifunctional shell-stabilized liquid metal pipe networks. The method described herein may provide a significantly faster extrusion rate than current methods. It may also provide the opportunity for tailoring the mechanically stabilizing liquid metal oxide shell to varied functionalities through adjustment of the secondary reactive fluid. Having observed liquid metal flow within the flexible oxide shell, also introduced is an electric switch and sensitive capacitive strain sensor based on flow of an insulator/metal liquid within a flexible channel.

Besides polymer encapsulated strain sensors discussed above, liquid metals have also been proposed for a number of other applications including microelectronic heat sinks, thermal interface materials, electrical interconnections and contacts, droplet-based micro-switches, microsyringes for cells, radio-frequency switches, magneto-hydrodynamic pumps, stretchable antennas, resonators, and tunable-frequency selective surfaces. Because of this wide application space, several new routes of manufacturing liquid metal structures aiming to replace the current labor intensive, non-scalable, and geometry-limited, syringe injection-molding-like fabrication process have been developed. In particular, routes to making liquid metal features using vacuum-induced patterning, contact printing, roller-ball pen, masked deposition, micro-fluidic flow focusing, co-electro-spinning, freeze-casting, airbrushing, and 3D printing have been proposed. However, manufacturing of gallium-based liquid metals may be complicated by rapid surface oxidation. Despite EGaIn and GaInSn having surface tension about an order of magnitude higher than that of water, formation of the thin oxide-skin leads to strong adhesion of these materials to a variety of surfaces. Recently, the fundamentals of complex wetting dynamics caused by the surface oxidation and several ways of mitigating its negative effects of the oxide skin have been developed.

To overcome high adhesion of surface-oxidized EGaIn and EGaInSn to different surfaces embedding of metal droplets in hydrophobic nanoparticles (i.e. liquid marbles), and textured metal-phobic surfaces, hydrochloric acid liquid or vapor treatment, and acid-impregnated surfaces have been proposed. In contrast, the oxide-skin formation has been used to mechanically stabilize GaInSn extruded from a moving syringe. Using this approach, a variety of simple and complex free-standing 3D liquid metal structures were able to be printed. While opening-up a new avenue for variety of applications, 3D printing of GaInSn using these methods may be limited to extrusion rates of 2 to 200 μm/s. Past this rate, the forming liquid metal structure breaks-off the nozzle tip. This mechanical failure may be due to exceeding the critical surface stress of ~0.5 N/m of the oxide formed through brief air exposure. This extrusion rate is an order of magnitude slower than typical extrusion rates of 2 to 3 cm/s achieved in commercial polymer 3D printers.

Figure 7:
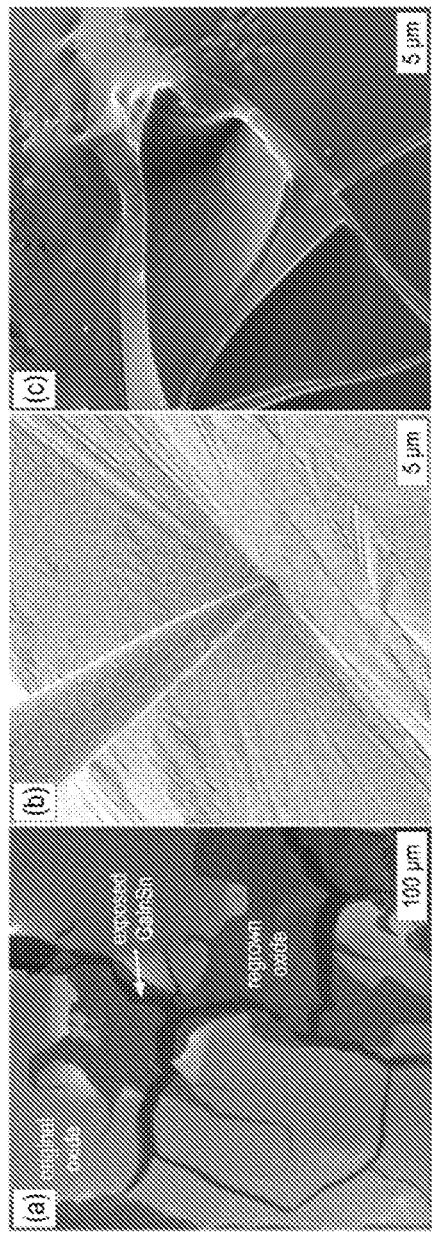
FIG. 7(a) shows different thickness of oxide on a GaInSn surface formed by a few brief on and off gallium ion irradiated cycles. During each irradiation cycle oxide skin cracks but quickly begins to regrow when the ion beam is off. Different shades of gray correspond to different oxide thickness in this ion induced secondary electron image, with darkest being the exposed GaInSn.
FIG. 7(b) shows deflection of natural elastic GaInSn oxide with a nanomanipulator.
FIG. 7(c) shows cracked thick mixed oxide and chloride shell formed after HCl vapor treatment. This shell is much stiffer than the original oxide skin.

The inventors' research has shown that oxide-layers with different thicknesses may co-exist and that the mechanical properties of the oxide-shell may be dramatically altered through chemical treatment. In particular, using Focused Ion Beam-Scanning Electron Microscope (FIB-SEM) equipped with EDS and nanomanipulator, the nano-to-microscale wetting and adhesion properties of GaInSn before and after HCl vapor treatment were investigated. Images in FIG. 7 show that different thickness of oxide form after original oxide perturbation using a brief Gallium ion irradiation (FIG. 7(a)), bending of the original elastic oxide skin with the nanomanipulator (FIG. 7(b)), and significantly thicker, stiffer shell formed after HCl vapor treatment (FIG. 7(c)).

Figure 8:
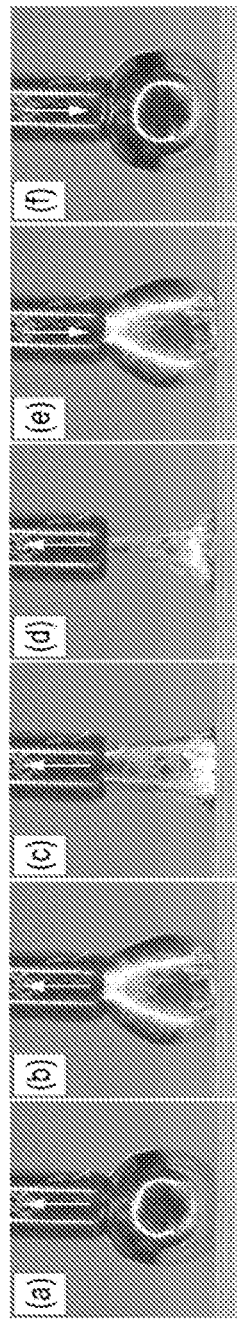
FIG. 8 shows images demonstrating repeatable draining and filling of oxide with liquid GaInSn; illustrating that the liquid metal can easily flow within its own shell.

The sequence of images in FIG. 8 illustrates another observation relevant to this disclosure. In particular, it shows draining and re-filling of "sack" consisting of the flexible oxide with the liquid GaInSn metal. This process may be repeated multiple times even with application of positive and negative pressure on the syringe.

Rapid 3D Printing of Functional Oxide Liquid Metals Pipes with Co-Flow Nozzles

Instead of relying on relatively slow air driven oxidation to form the fragile oxide shell, this example describes the use of a co-flow nozzle with liquid metal and various other gases or liquid for optimizing the surface of liquid metals for a variety of applications. The secondary fluid may have multiple purposes including increased rate of shell formation, tailoring of various properties of the shell, and/or shaping the liquid metal flow (e.g. focusing to a smaller diameter, even down to nanoscale). FIG. 4 shows a schematic of one example of a liquid metal pipe extruder. In an example operation, the liquid metal will flow through the middle of the nozzle and upon exiting be exposed to a reactive gas (e.g., HCl) from the outer flow. The selection of the outer fluid will be dependent on the desired shell characteristics. For example air, oxygen, ozone, chlorinated gases, nitrous oxide, fluorinated gases, and brominated gases or compounds (i.e., flame retardants) could be used to increase the rate of formation and thickness of the exterior shell, which can comprise of solid oxides or other compounds such as chlorides or nitrides. Another example includes use of a liquid with an oxide binding polymer such as polyvinyl alcohol (PVA) to form the exterior of the shell (PVA was previously used to stabilized EGaIn microdrops). Another example may include an electrolyte with imposed voltage to grow the shell electrochemically. Both of these examples would lead to significantly faster extrusion of a liquid metal pipe stabilized with a mechanically robust shell. The flow could also be reversed, with liquid metal on the exterior, producing a secondary fluid on the interior. This co-flow scheme could be used to make annular liquid metal pipes with an internal and external shell. In principle, flow of a third fluid on the exterior of the metal could also be incorporated for design of a multi-layered shell on the liquid metal.

A variety of different reactive fluids may be used to induce formation of shells with different mechanical, chemical, electrical, and thermal properties and functions. Thus the choice of the outer fluid may be tailored to the specific functionality desired for the shell material/surface, while at the same time enabling free liquid metal flow inside. This may lead to rapid 3D nano/microfabrication of liquid metal networks for a variety of applications. 3D printed liquid metal pipe networks may be functional on their own or serve as the conductive skeleton for encapsulation in a flexible polymer matrix.

Novel Insulator/Metal Liquid Electro-Mechanical Switch and Capacitance-Based Strain Sensor The inventors' research has also shown that, with application of minimal pressure, the liquid metal can flow freely within its own shell (i.e., FIG. 8). Thus, flow of multiple liquids was investigated. Herein, two devices are described that take advantage of this phenomenon to achieve novel electro-mechanical functionalities. In particular, the proposed devices may be a strain dependent on/off switch and simple capacitance based strain sensors with high responsiveness (in contrast to current capacitance based strain sensors in liquid electronics, one example embodiment may be achieved within a single channel). FIGS. 1(a)-(b) show that the two-liquid switch may include a side channel filled with the insulating liquid gated by a strain dependent gate. When stretched, the gate may be pulled open releasing the insulating liquid and causing an open circuit. A similar concept with just a strain dependent valve and only liquid metal may be possible as well.

FIGS. 3(a)-(b) shows a schematic of single channel metal/insulator/metal liquid strain sensor concept. To estimate the sensitivity of the capacitance (C) of this device to strain, the parallel plate model is used:

$$C = \frac{\varepsilon A}{L} \quad \text{(Eq. 1)}$$

Where $\varepsilon$ is the permittivity of the dielectric liquid, A is the area of the plate, and L is the plate thickness. Assuming that the dielectric liquid is incompressible, change in length from $L_1$ to $L_2$, will cause a cross-sectional area change to $A_2 = A_1 L_1 / L_2$.

$$\frac{C_2}{C_1} = \left(\frac{L_1}{L_2}\right)^2 \quad \text{(Eq. 2)}$$

This shows that the capacitance change is proportional to the square of inverse of the stretch ratio, which may allow for highly sensitive sensors Example 2: Design and Characterization of a Single Channel Two-Liquid Capacitor and its Application to Hyperelastic Strain Sensing 1. Introduction This example explores a capacitor composed of two liquid metal electrodes separated by a liquid dielectric material within a single straight cylindrical microchannel (see schematic in FIG. 9). Simulations and an experimental setup consisting of two GaInSn filled tubes submerged in a dielectric liquid bath were used to quantify the effects of the cylindrical electrode geometry including the diameter, spacing, and meniscus shape as well as the dielectric constant of the insulating liquid and the presence of tubing on the overall system's capacitance. Then a procedure is described for fabricating the two-liquid capacitor within a single straight cylindrical PDMS channel. The capacitance and response of this compact device to strain is characterized and operational issues arising from complex hydrodynamics near liquid-liquid and liquid-elastomer interfaces are identified.

Figure 10:
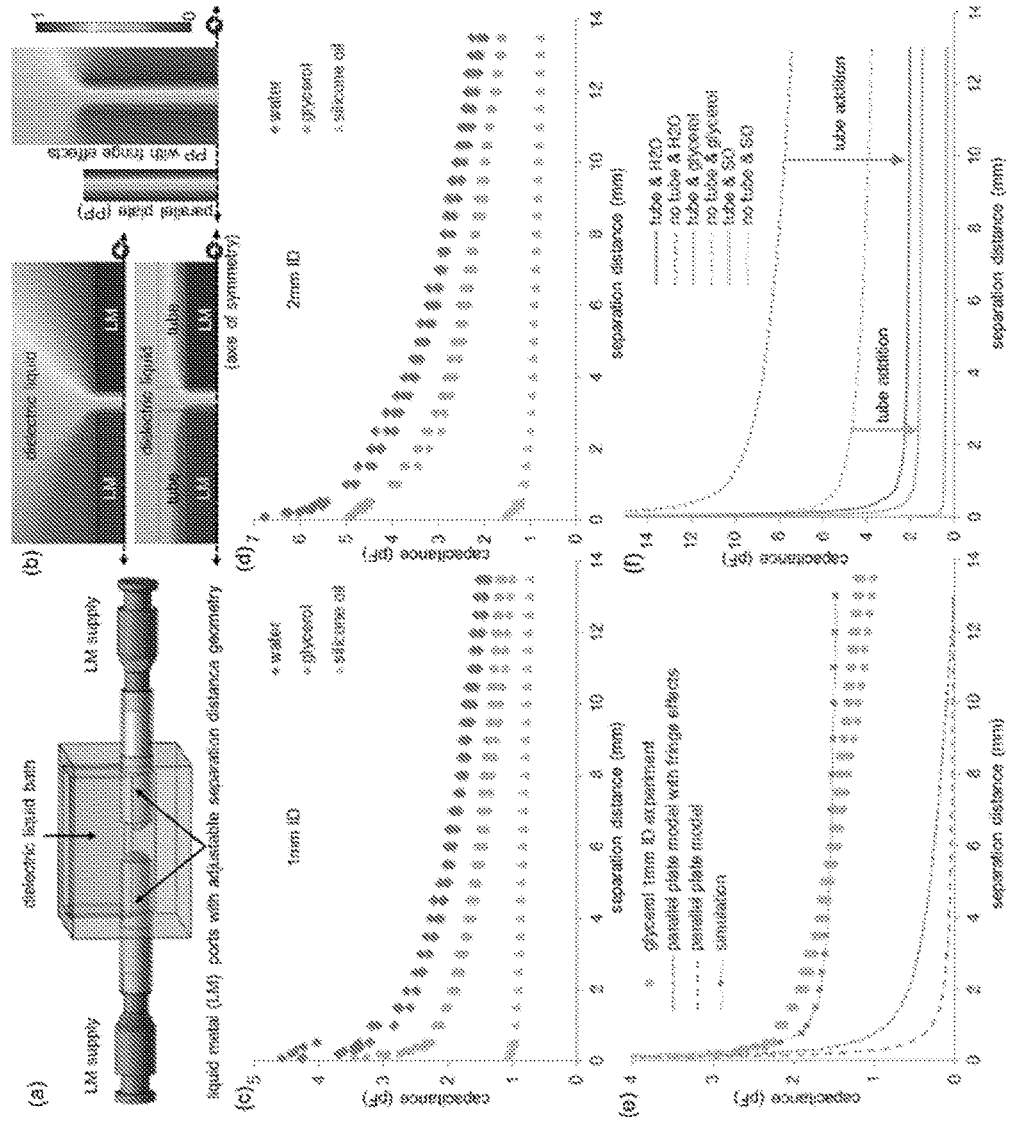
FIG. 10(a) shows the setup used to characterize the capacitance of the liquid metal (LM)-liquid dielectric capacitor.
FIG. 10(b) shows an example of simulated potential fields around the capacitors consisting of flat-ended cylinders with and without tubing as well as parallel plates with and without electric fringe effects.
FIGS. 10(c)-(d) shows the measured capacitance of two flat-ended cylindrical metal electrodes with diameters of (c) 1 mm and (d) 2 mm separated by silicone oil, glycerol, and water.
FIG. 10(e) shows a comparison of experimentally measured, simulated, and calculated capacitance using a parallel v. plate model with and without fringe effects for two flat-ended cylindrical metal electrodes with 1 mm diameter separated by glycerol.
FIG. 10(f) shows a comparison of simulated capacitance values for cylinders with and without tubing.

2. Results and Discussion 2.1 Effects of Geometry and Dielectric Liquid on Capacitance of the Two-Liquid System In order to systematically study the effects of geometry on capacitance of the two-liquid system without the hassle of fabrication of multiple devices we have developed a simple testing setup shown in FIG. 10(a). This system consists of two GaInSn filled thin-walled PVC tubes ($\varepsilon$~3.2) that are aligned along the same axis and submerged in a dielectric liquid bath. The tubes were filled with GaInSn up to their open ends, which were arranged to face each other. The separation distance between the two tubes was adjusted using a micrometer and the shape of each of the liquid metal-liquid dielectric interfaces was controlled by applying pressure to the syringes that were used to supply the liquid metal. The capacitance of the various systems was numerically simulated with a 2D axisymmetric geometry using COMSOL Multiphysics 5.0 modelling software. Example potential fields around flat-ended cylinders with and without tubing as well as parallel plates with and without electric fringe effects are shown in FIG. 10(b). Due to high solubility of oxygen in glycerol and water as well as its high permeability through PDMS a ~2 nm thick gallium oxide skin is likely to form at the two-liquid interface. However, its presence will have negligible effect on the system's capacitance. Further details of the setup fabrication are described in the Experimental section and those of the numerical simulation in the ESI, while experimental and simulation results are described below.

2.1.1 Effects of Separation Distance and Dielectric Liquid

The capacitance was measured for two flat-ended cylindrical electrodes with diameters of 1 mm and 2 mm separated by 0.1 mm to 13.5 mm that were submerged in glycerol, water, and as reference, silicone oil. The latter insulator has a dielectric constant ($\varepsilon$) between 2.2 and 2.8 and served as a control to mimic the PDMS elastomer. The plots in FIGS. 10(c) and 10(d) show that by replacing silicone oil with glycerol and water the system's capacitance increases from ~1-1.5 pF to ~4-5 pF and ~6-7 pF for electrode separation distances below ~0.5 mm, respectively. This 3- to 5-fold capacitance increase is significantly smaller than the ~15 (40/2.8) to ~30 (80/2.8) increase predicted by dielectric constant ratios described in the Introduction section. In addition, doubling of the electrode diameter increases the measured capacitance by a factor of two, not four, as predicted by the basic parallel plate model. To explain these trends we compared experimental data to simulations as well as theoretical predictions using the parallel plate model with and without fringe effects. The latter model takes into account that the electrical field does not end abruptly outside of the electrode plates and incorporates the electrical field fringe effects illustrated in FIG. 10(b) around the edges of the two electrodes (but not along the cylinder):

$$\varepsilon_0 \varepsilon \left[ \left(\frac{\pi r^2}{d}\right) + r \ln\left(\left(\frac{16 \pi r}{d}\right) - 1\right) \right] \quad (1)$$

where r is the electrode radius. The plot in FIG. 10(e) compares typical measured capacitance (in this case, 1 mm diameter electrodes wrapped in 0.5 mm thick tubing separated by glycerol) as a function of separation distance to the simulation and analytical predictions. For small separation distances, the experimentally measured capacitance decreased proportionally to 1/d, in agreement with the parallel plate model scaling. However, when the separation distance was greater than ~1 mm, the measured capacitance values exceeded those predicted by either of the models by two to three times. In contrast, the simulation results, which capture the effects of the electrical field along the cylinders as well as the presence of the tube and the dielectric liquid outside the separation gap, match the experimental data well. The simulation results in FIG. 10(f) also show that the addition of tubing around the liquid metal electrodes results in a large decrease the system's capacitance. Without the tubing, the switch from silicone oil to glycerol and water for 1 mm ID cylinders separated by 10 mm increases the capacitance from 0.37 pF to 3.93 pF and 7.76 pF, respectively. This corresponds ~11- and ~21-fold capacitance increases related to the dielectric liquid change. The ~30% discrepancies between these values and those predicted from dielectric constant scaling likely stem from the finite dielectric bath volume in the simulations, which were designed to represent our experimental "bath" system. The presence of tubing, however, does not account for the capacitance scaling with the radius of the cylinders, not their end-areas. In particular, according to the simulations, increase in two "tube-less" metal cylinder diameters separated by 10 mm from 1 mm to 2 mm in silicone oil, glycerol, and water increases the capacitance by ~2.2 (7.9/3.7), ~2.5 (8.6/3.4), and ~2.2 (16.9/7.8), respectively. This confirms strong influence of the electric field fringe effects along the tube as well as outside the electrode separation area, the latter of which scale with the radius of the electrode according to eqn (1).

2.1.2 Effect of the Liquid-Liquid Interface Shape

Next, the effect of the curvature of the liquid metal-liquid dielectric interfaces on the system's capacitance was investigated. Quantification of this effect is particularly relevant to the two-liquid capacitor because a meniscus is likely to form at the liquids' interface due to the large difference between their surface tensions. The capacitance of electrodes with two types of menisci shown in FIG. 11(a) was measured. The geometry of the menisci approached that of spherical-caps with liquid metal tube contact angles (θ) of ~55-60° and ~90-100°, as defined from the line connecting the edges of the tube. The capacitance of the two-electrode system was simulated with θ=90° (see FIG. 11(b)). The results are shown in FIGS. 11(c) and (d) in terms of meniscus tip-to-meniscus tip separation distance, while data in terms of meniscus base-to-meniscus base (i.e. end-of tube to end-of-tube) separation distance are provided in the ESI. The tip-to-tip distance was decreased until the electrodes touched and short-circuited by merging. Plots in FIG. 11(c) to (d) show that the highest capacitance was measured for the systems consisting of two electrodes with menisci with θ~90-100° (i.e. about hemispherical), irrelevant of how the separation distance was specified. To theoretically take into account the meniscus shape, we also compare the experimental data in FIG. 11(d) to both simulations and series solution predicting the capacitance of two conducting spheres.

$$C = 2\pi\varepsilon_0\varepsilon\frac{a}{2}\sum_{l=0}^{\infty}\left(l+\frac{1}{2}\right)C_l(\cosh\eta_1)C_l(\cosh\eta_2)\operatorname{csch}\left[\left(l+\frac{1}{2}\right)(\eta_1-\eta_2)\right] \quad (2)$$

In eqn (2) the two spheres are positioned along the z-coordinate and are defined by a and $\eta_i$ in the bi-spherical system with $r_i=a|\operatorname{csch}\eta_i|$ and $z_i=a\coth\eta_i$. The function $C_l(\cosh\eta_1)$ is defined as:

$$C_l(\cosh\eta_1) = \frac{1}{2^l N_l}(\operatorname{sech}\eta_1)^{\frac{1}{2}+l} \, _2F_1\left(\frac{l}{2}+\frac{1}{4}, \frac{l}{2}+\frac{3}{4}, l+\frac{3}{2}, \operatorname{sech}^2\eta_1\right) \quad (3)$$

In eqn (3) $N_l$ is the normalization factor of the Legendre polynomials ($N_0=1$, $N_1=1$, $N_2=0.5$, $N_3=0.5$, $N_4=0.125$, $N_5=0.125$ etc.) and $_2F_1$ is the hypergeometric function. Unfortunately, as shown in FIG. 11(b), the two-sphere model does not capture well the potential field distribution outside of the two-electrode separation gap and along the cylinders (with and without tubing). Consequently, the analytical model significantly under-predicts the capacitance. However, as in the case of flat-ended cylinders, the simulated values match the experimental values reasonably well (see FIG. 11(d)). As observed in the experiments, the simulated capacitance of the hemisphere-ended cylinder system exceeds that of the flat-ended cylinder system for separation distances greater than ~0.1 mm. This effect likely stems from combination of the electric field distribution and larger interfacial "cap" area of the hemisphere ($2\pi r^2$ vs. $\pi r^2$).

2.1.3 Effect of Oxide-Skin Growth at the Liquid-Liquid Interface

The effect of the capacitance of the two-liquid capacitor by formation of the gallium oxide skin was investigated. This few nanometers-thin film rapidly forms at the interface between the liquid metal and all studied dielectrics due to high solubility of oxygen in the dielectric liquids as well as its high permeability through PDMS. The effect of oxide skin growth on the device capacitance was quantified using simple modification of the setup shown in FIG. 10(a). Just prior to start of the experiment, the original oxide skin formed at the two-liquid interface was removed with tweezers (while the electrode was submerged in the dielectric liquid). Its removal and subsequent regrowth was confirmed visually, with the bare liquid metal having reflective "shinny" surface and the regrown oxide having "dull" gray appearance. Because removal of the oxide skin at both of the liquid metal terminals could not be achieved simultaneously, one of the liquid metal ports was replaced with a small metal plate. After oxide skin was removed, the capacitance values were recorded for 10 minutes. The results were that the capacitance remains constant for the entire measurement period for all dielectric liquids, which indicates that presence of the oxide skin does not affect the system's capacitance.

Figure 12:
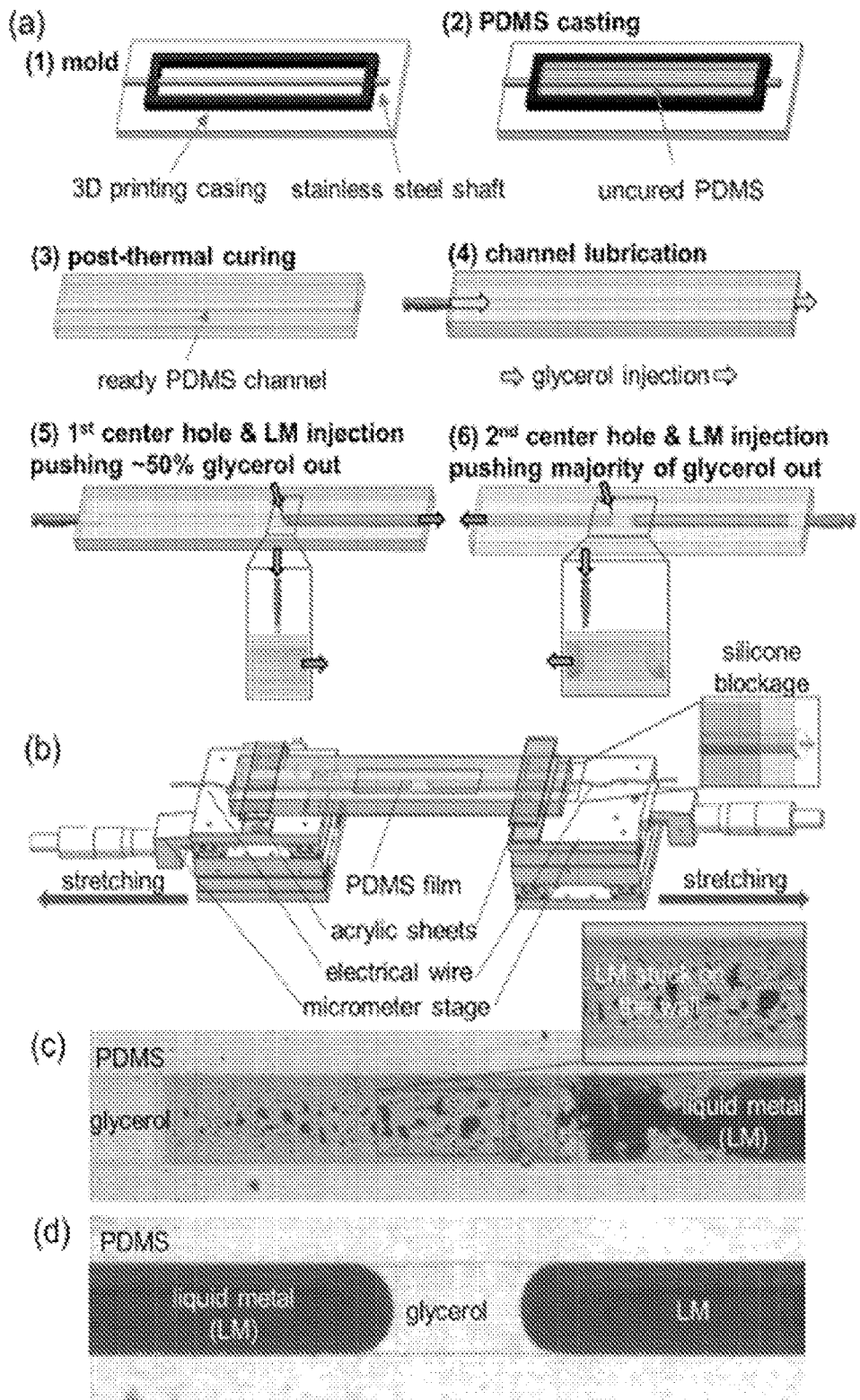
FIG. 12(a) shows an image of the single channel two-liquid capacitor fabrication procedure.
FIG. 12(b) shows the single channel two-liquid capacitor mounted in a strain testing setup.
FIG. 12(c) shows an image of residual liquid metal (LM) after it was partially pushed out with the glycerol flow.
FIG. 12(d) shows an image of the 1.6 mm diameter two-liquid capacitor fabricated using the procedure shown in FIG. 12(a).

2.2 Single Channel Two-Liquid Capacitive Strain Sensor 2.2.1 Device Fabrication Procedure The results presented in section 2.1 show that a two-liquid capacitor can have C ~5-8 pF with a footprint of only 1-2 mm$^2$ (i.e. ~50-fold reduction compared to two channel capacitors). Motivated by these results, this section explores the viability of a single-channel two-liquid capacitive strain sensor. This device differs from the experimental setup used in section 2.1 in that the liquid metal electrodes and the liquid dielectric are encapsulated within a single channel as opposed to having two liquid metal filled tubes separated by a liquid dielectric bath. As shown in the schematic in FIG. 12, the device was fabricated by casting elastomer solution over a 3D printed rectangular casing pierced by a horizontal stainless steel shaft. After thermal curing of the elastomer, the two open-ended cylindrical channel was created by removing the casted elastomer from the mold and pulling out the steel shaft. Filling of this channel with liquid metal electrodes separated by the liquid dielectric was the primary challenge in fabricating the two-liquid capacitive strain sensor. In principle this could be achieved by altering the flow of the two liquids. However, flowing of silicone oil, glycerol, and water into the PDMS channel filled with GaInSn resulted in residual liquid metal patches adhering to the channel walls (see FIG. 12(c)). In general, this can be attributed to the formation and resulting morphology of the gallium oxide shell-substrate interface. To resolve this issue the PDMS channel was "lubricated" prior to flowing GaInSn with flow of the dielectric liquid, preventing residual GaInSn adhesion to the PDMS walls. After lubricating the channel with the dielectric material, liquid metal was injected via a small temporary vertical hole near the middle of the channel. Temporarily sealing of one of the channel ends enabled the liquid metal to push about half of the dielectric liquid out of the channel through the open-end. After sealing of the first vertical hole with PDMS, majority of the remaining liquid dielectric material was pushed out through the previously sealed end by liquid metal that was injected through a second temporary vertical hole made nearby the original one. The image in FIG. 12(d) shows that this procedure avoids sticking of liquid metal to the walls and can be used to fabricate single channel GaInSn-glycerol-GaInSn and GaInSn-water-GaInSn junctions. Since the surface tension of glycerol (63 mN m$^{-1}$) and water (72 mN m$^{-1}$) is much smaller than that of GaInSn (718 mN m$^{-1}$), the liquid metal forms a convex or "bulging" hemispherical meniscus on both sides of the junctions.

2.2.2 Device Performance

Figure 13:
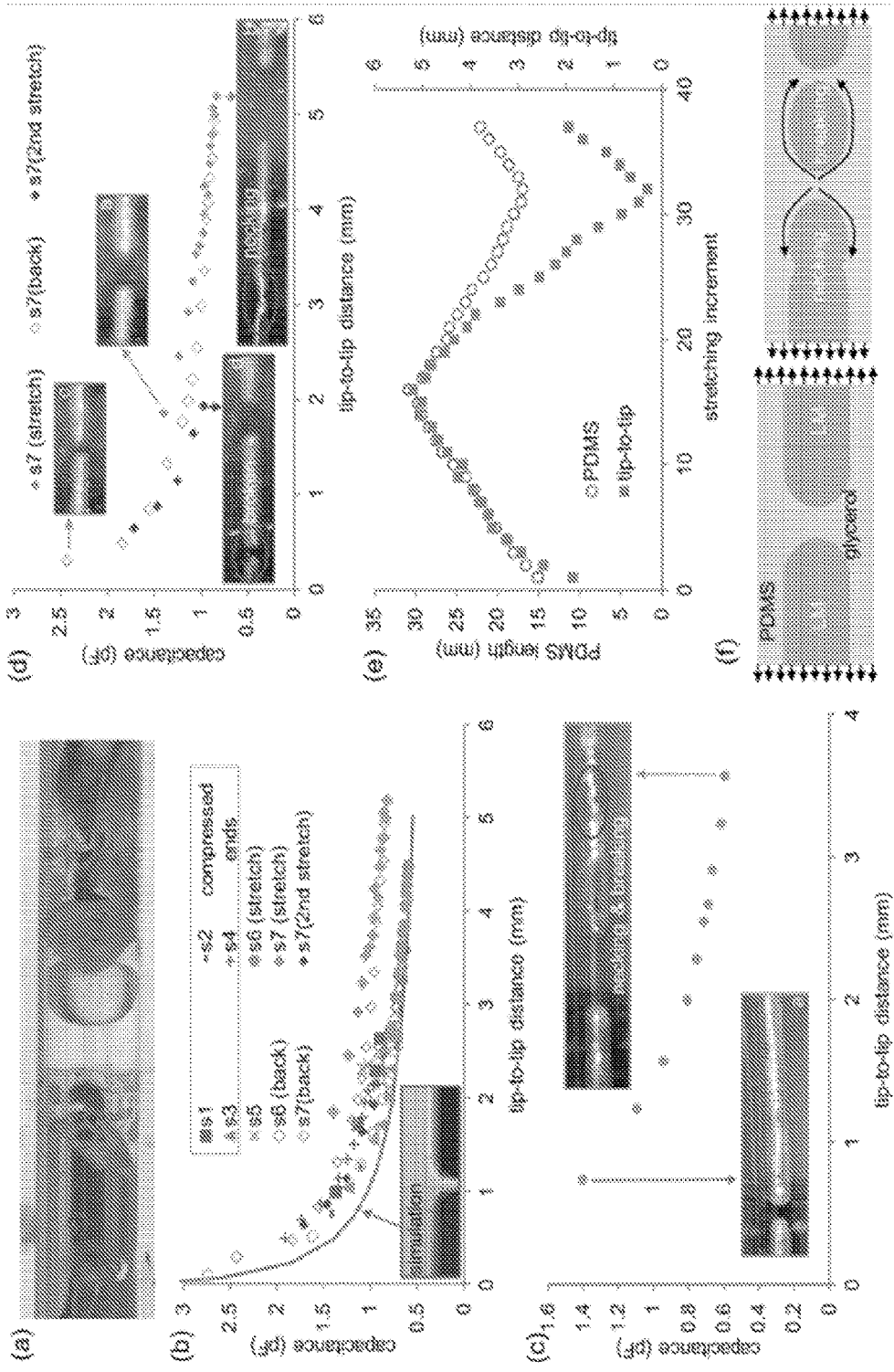
FIG. 13(a) shows an image of the GaInSn-water-GaInSn device after initial stretching.
FIGS. 13(b)-(d) show plots of measured capacitance as a function of liquid metal meniscus tip-to-tip separation distance for various GaInSn-glycerol-GaInSn devices: (b) shows all devices, (c) shows s2 device which had electrode separation distance reduced by "squeezing" or "compressing" the non-facing device ends, (d) shows s7 device whose non-facing device ends were not compressed.
FIG. 13(e) shows a comparison of PDMS device length and electrode meniscus tip-to-tip separation distance during stretching.
FIG. 13(f) shows a schematic of glycerol device failure modes induced by the glycerol outflow into the annual region separating PDMS and the electrodes.

The described procedure could be used to repeatedly fabricate single channel two-liquid capacitors with glycerol and water as dielectric liquids. However, fabrication of a complete two-liquid device that was stable under "static" conditions did not guarantee its stability during stretching. For example, the image in FIG. 13(a) shows that during initial stages of stretching of the GaInSn-water-GaInSn capacitor, the liquid metal electrodes did not move gradually but "snapped" leaving behind residues on the PDMS walls. The sudden movement and residual GaInSn indicate that the oxide shell grew at the liquid metal-PDMS interface causing high adhesion. Consequently, the use of water as dielectric liquid was found to be impractical and capacitors filled with glycerol were focused on. Due to the manual nature of the current fabrication process the electrode-to-electrode separation distance was difficult to control. The minimal meniscus tip-to-tip distance that was fabricated using this procedure was ~2.3 mm. This system had an unstrained capacitance ($C_0$) of 1.1 pF with a footprint of about 3 mm$^2$. It was observed that the separation distance between the two electrodes can be reduced by compressing the other edges of the PDMS channels filled with liquid metal. This forced some of the glycerol stored in between the electrodes to flow into the thin annular gap along the PDMS and GaInSn interface. Using this approach reduce the tip-to-tip electrode separation distance was able to be reduced down to ~0.5 mm to ~1 mm, which produced a capacitance of ~2 pF to ~1.4 pF with a corresponding footprint of ~0.8 mm$^2$ to 1.6 mm$^2$.

The capacitance of several glycerol-liquid metal capacitor channels was measured during stretching using the setup illustrated in FIG. 12(b). The plot in FIG. 13(b) shows the response to the strain of devices that had as-fabricated electrode separation distance (s5 to s7) as well as several devices that had the electrode-separation distance reduced by compressing the outer edges of the PDMS channels (s1 to s4). All the devices had initial tip-to-tip separation distance in the range of ~0.5 mm to ~2.5 mm. Since the devices had different initial electrode-to-electrode spacing, the data are presented in absolute terms. All the data follow the trends expected from FIGS. 10 and 11 as well as the simulation of the system. However, the geometry of the devices was altered by the stretching process in two ways. The first mode involved separation of the liquid metal electrode induced by the device stretching. The plot in FIG. 13(c) shows stretching data for the "s2" device with corresponding images of the electrodes prior to and at the end of stretching. One of the electrodes in this device was separated into two parts through gradual necking as the device was stretched. Separation of the two electrodes created two capacitors in series, which significantly decreased the total capacitance. The role of the glycerol outflow from the electrode separation region is clearly highlighted in the second scenario illustrated in FIGS. 13(d) and (e). Specifically, neither of the electrodes separated as the meniscus tip-to-tip distance was increased from ~2 mm to ~5 mm (with a stretch ratio of 5 mm/2 mm ~2.5). The plot in FIG. 13(e) shows that during this part of stretching the PDMS length and the meniscus tip-to-tip distance were roughly proportional, with a stretch ratio of ~2 observed for PDMS. However, during the retraction the two distances did not decrease proportionally. In particular, the separation distance between the electrodes decreased below the starting ~2 mm to ~0.1 mm. Naturally, for this to occur the glycerol must have been displaced by the liquid metal. The decrease in the electrode separation distance increased the capacitance to ~2.5 pF from the starting C0~1.4 pF. For this device, the glycerol outflow to the annual region only caused necking during the first stretching and retraction (back) cycle. The images in FIG. 13(e) show that one of the electrodes finally separated during the second stretching cycle. FIG. 13(f) schematically shows that both electrode necking and breaking are due to the glycerol outflow into the annual region between the electrode and PDMS. Once excess glycerol is stored within this region; stretching of the device induces radial stresses which force the glycerol to break up the liquid metal electrode.

3. Conclusions

A capacitor was introduced consisting of a liquid dielectric material sandwiched in between two liquid metal electrodes within a single straight cylindrical channel. As discussed above, simulations and a simple setup consisting of two liquid metal filled tubes submerged in a dielectric liquid bath were used to quantify the effects of the electrode geometry including the diameter, separation distance, and meniscus shape as well as the dielectric constant of the insulator liquid on the system's capacitance. It was demonstrated that by replacing silicone oil with glycerol and water a three- to five-fold increase in the system's capacitance can be achieved. This increase is substantial but not as large as expected based on the ratio of the dielectric constants of the insulator liquids. Using simulations it was shown that this effect is due to the presence of low dielectric constant tubing (PVC and PDMS). Using simulations it was also demonstrated that electric fringe effects outside the separation gap and along the cylinder are responsible for the capacitance scaling with the radius of the electrodes and not their end areas. It was found that for all geometries the measured capacitance cannot be predicted by classical analytical models for parallel plate or two-sphere capacitors and that full system numerical simulation is required to adequately capture the electrical field distribution. With the optimal geometry composed of hemispherical menisci and minimal separation distance, it was found that glycerol and water systems with a capacitance of ~5 pF to ~8 pF and a footprint of only ~1-2 mm$^2$ are feasible.

In the second part of this paper, we explored the feasibility of using a two-liquid capacitor within a single PDMS channel for hyperelastic strain sensing. Residual GaInSn adhesion to the channel walls was prevented by lubricating the PDMS channel with water and glycerol prior to liquid metal injection. This enabled fabrication of single-channel liquid metal capacitors separated by glycerol and water. Unfortunately, oxide regrowth at the GaInSn-PDMS interface in the presence of water rendered strain sensors with water as the dielectric material impractical. In particular, when stretching, the liquid metal electrodes did not deform gradually but suddenly "snapped" leaving behind residual GaInSn on the PDMS walls. This behavior was not observed in glycerol devices, indicating persistent PDMS wall lubrication by this dielectric liquid. For glycerol devices fit within a 1.6 mm diameter channel, the minimal meniscus tip-to-tip distances achieved with and without compressing of the device's outer edges were ~0.5 mm and ~2.3 mm, corresponding to capacitance values of ~2 pF and ~1.1 pF with footprints of ~0.8 mm$^2$ and ~3 mm$^2$, respectively. Thus, it was demonstrated that a single PDMS channel two-liquid capacitor can have about a ~25-fold higher capacitance per sensor's base area as compared to the current winding two-channel capacitors (2 pF/0.8 mm$^2$ vs. ~10 pF/100 mm$^2$). However, further experiments revealed that the liquid metal electrode geometry was altered by stretching. In particular, pressure induced by the stretching caused the outflow of glycerol from the region separating the electrodes to the annual region between the electrode and the PDMS channel wall. As a result, necking and breaking of the liquid metal electrodes were observed. Thus, while enabling fabrication and facile movement of the liquid metal electrodes, the presence of the "lubricating" glycerol also causes failure of the two-liquid capacitor. This work illustrates that single channel two-liquid capacitors could provide a ~25 times more compact alternative to the current capacitive liquid metal strain sensors. Alternative designs may include modification of the channel wall surface to reduce GaInSn adhesion, an alternative channel filling procedure or a hybrid approach between the single channel design and multichannel design. Another option may be to include an "overflow" region for the glycerol squeezed out of the center region.

4. Experimental Section

Materials

GaInSn with a composition of 68.5% Ga, 21.5% In, and 10% Sn was purchased from Rotometals. Water was purified to a resistivity of 18 MΩ cm using a Thermo Scientific™ Barnstead™ NanoPure™ system. Glycerol (≥99.5%, Sigma-Aldrich G9012) and silicone oil (viscosity, 100 cSt, Sigma-Aldrich, 378364) were used as the other two dielectric liquids. Elastomer substrates for capacitive strain sensors were fabricated by mixing elastomer base weighing 10 parts (around 15 g) and curing agent weighing 1 part (around 1.5 g) (Dow Corning, Sylguard 182, silicone elastomer kit).

Two Liquid Metal Filled Tubes within a Dielectric Bath Setup

The ABS system housing was 3D printed using Makerbot Replicator 2× and filled with dielectric liquids. The housing had two ports for passing liquid metal channels made of 1 mm or 2 mm internal diameter (ID) Masterkleer PVC tubing (Mcmaster-Carr), which was connected to 1 mL plastic syringes (Mcmaster-Carr) with corresponding 0.08 cm or 0.2 mm ID and 1.26 cm length blunt tip dispensing needles (Mcmaster-Carr). The spacing between the ends of the liquid metal tubes was adjusted using two micro-positioning stages (Deltron, 1201-XYZ) attached to the 3D printed syringe holders using adhesive tape. For all of the tests, a 889B Bench LCR/ESR Meter was used to measure capacitance and dissipation factors at a frequency of 200 kHz and a voltage of 1 V in parallel mode. A home-made faraday cage was used to shield the devices from electromagnetic interference during measurements. To make electrical contacts, copper wires were soldered onto the conductive syringe needles. The stray capacitance of the system was quantified with just air at different levels of relative humidity as well as long electrode separation distances. The results were that the stray capacitance was negligible. To study the effect of the liquid metal meniscus shape on device capacitance, the bottom of the 3D printed housing was replaced by a pre-cleaned glass slide (Thermo Scientific). This modification enabled detailed visualization of the meniscus shape using transmitted light in a Zeiss Axio-Zoom V 16 microscope fitted with a Z 1.5×/0.37 FWD 30 mm lens. Menisci with two different spherical-cap shapes characterized by the metal-tube contact angles of ~60° and ~90° were fabricated by manually adjusting the syringes. The capacitance was measured off-site within the faraday cage after the geometry of the device was adjusted under the microscope.

Single Channel Two-Liquid Capacitor Fabrication Procedure

The channel was fabricated within a single step by casting the elastomer solution over a 3D printing rectangular casing pierced by a 1.6 mm diameter and 7.6 cm length stainless steel shaft (McMaster-Carr). The PDMS solution was mixed in Petri dishes and poured into the mold. Before curing the PDMS mixture was degassed for around 30 minutes until all air bubbles escaped. Subsequently, the casted elastomer was heated for 1.5 h at 85° C. on a hot plate. After curing, the cast was removed from the mold, with the steel shaft simply pulled out to create the two-open-ended channel with circular cross-section. To fabricate the three-sandwiched liquid layout while preventing the liquid metal from adhering to the wall of the channel during stretching, the dielectric liquids were injected first in order to lubricate the channel. Next, one side of the channel was blocked with a syringe and GaInSn injected by piercing a hole through the top of the PDMS into the channel using a 1 mL syringe with 1.26 cm long 0.03 cm ID blunt tip dispensing needles (McMaster-Carr, 75165A686). As a result the insulating liquid was ejected from the free side of the channel. To prevent leakage during testing, the vertical hole was sealed with a few drops of the uncured elastomer to the hole on the top and let it cure naturally without additional heating (to prevent hardening of the PDMS). After the first hole was sealed, another point located at a specified distance away from the first one was made and liquid metal was injected again to push out majority of the dielectric liquid from the channels. The result was a controlled amount of dielectric liquid separating the GaInSn. To finalize the device fabrication, wires were inserted into the ends of the channels.

PDMS Sensor Stretching Experiments

The ends of the PDMS devices were mounted onto two micro-positioning stages (Deltron, 1201-XYZ) by sandwiching them between flat acrylic "clamps". For experiments involving the devices with "compressed" non-facing ends, the channel ends were fitted with a thin copper wire and sealed using silicone prior to mounting on the stage (thus clamping compressed the ends of the device). For testing of the non-squeezed devices, the channel ends were sealed after clamping onto the stage. During each stretching step the device was photographed from a top-down view using a Nikon 3200 camera. The capacitance of the system without the PDMS channel being filled with liquid metal electrodes (so wires, stages etc) in air below 50% relative humidity was below 0.15 pF for PDMS with a length of ~2.7 cm.

The invention claimed is:

1. An electric switch apparatus, comprising:
a base comprising a first channel and a second channel, wherein the base comprises a flexible polymer and a strain-dependent gate coupling the first channel to the second channel;
an electrode disposed in the first channel, wherein the electrode comprises a cavity and a liquid metal disposed in the cavity; and
an electrically insulating liquid at least partially disposed in the second channel, wherein in a strained condition a portion of the electrically insulating liquid extends into the first channel dividing the electrode into at least two electrically isolated chambers within the first channel, and wherein in an unstrained condition the cavity of the electrode is undivided.

2. The electric switch apparatus of claim 1, wherein the strain-dependent gate is biased closed in the unstrained position and biased open in the strained condition.

3. The electric switch apparatus of claim 1, wherein the first channel and the second channel are arranged perpendicular to one another.

4. The electric switch apparatus of claim 1, wherein the liquid metal comprises a gallium-based liquid metal comprising one or more of GaIn, GaInSn, and a gallium alloy.

5. The electric switch apparatus of claim 1, wherein the electrode comprises a metal pipe having an oxidized external shell defining the cavity.

6. An electric switch apparatus, comprising:
a base comprising one or more channels, wherein the base comprises a flexible polymer;
an electrode disposed in at least one of the one or more channels, wherein the electrode comprises a cavity and a liquid metal disposed in the cavity and the liquid metal comprises a gallium-based liquid metal comprising one or more of GaIn, GaInSn, and a gallium alloy; and
a strain dependent gate defined by opposing walls of the channel, wherein in a strained condition the strain-dependent gate maintains an open position such that the cavity of the electrode is undivided, and wherein in an unstrained condition the strain-dependent gate maintains a closed position dividing the electrode into at least two electrically isolated chambers.

7. The electric switch apparatus of claim 6, wherein the electrode comprises a metal pipe having an oxidized external shell defining the cavity.

8. An electric switch apparatus, comprising:
a base comprising a first channel and a second channel, wherein the base comprises a flexible polymer;
an electrode disposed in the first channel, wherein the electrode comprises a cavity and a liquid metal disposed in the cavity, wherein the liquid metal comprises a gallium-based liquid metal comprising one or more of GaIn, GaInSn, and a gallium alloy; and
an electrically insulating liquid at least partially disposed in the second channel, wherein in a strained condition a portion of the electrically insulating liquid extends into the first channel dividing the electrode into at least two electrically isolated chambers within the first channel, and wherein in an unstrained condition the cavity of the electrode is undivided.

9. The electric switch apparatus of claim 8, wherein the base further comprises a strain-dependent gate coupling the first channel to the second channel, and the strain-dependent gate is biased closed in the unstrained position and biased open in the strained condition.

10. The electric switch apparatus of claim 8, wherein the first channel and the second channel are arranged perpendicular to one another.

11. The electric switch apparatus of claim 8, wherein the electrode comprises a metal pipe having an oxidized external shell defining the cavity.

12. An electric switch apparatus, comprising:
a base comprising a first channel and a second channel, wherein the base comprises a flexible polymer;
an electrode disposed in the first channel, wherein the electrode comprises:
a cavity and a liquid metal disposed in the cavity; and
a metal pipe having an oxidized external shell defining the cavity; and
an electrically insulating liquid at least partially disposed in the second channel, wherein in a strained condition a portion of the electrically insulating liquid extends into the first channel dividing the electrode into at least two electrically isolated chambers within the first channel, and wherein in an unstrained condition the cavity of the electrode is undivided.

13. The electric switch apparatus of claim 12, wherein the base further comprises a strain-dependent gate coupling the first channel to the second channel, and the strain-dependent gate is biased closed in the unstrained position and biased open in the strained condition.

14. The electric switch apparatus of claim 12, wherein the first channel and the second channel are arranged perpendicular to one another.

15. An electric switch apparatus, comprising:
a base comprising one or more channels, wherein the base comprises a flexible polymer;
an electrode disposed in at least one of the one or more channels, wherein the electrode comprises:
a cavity and a liquid metal disposed in the cavity; and
a metal pipe having an oxidized external shell defining the cavity; and
a strain dependent gate defined by opposing walls of the channel, wherein in a strained condition the strain-dependent gate maintains an open position such that the cavity of the electrode is undivided, and wherein in an unstrained condition the strain-dependent gate maintains a closed position dividing the electrode into at least two electrically isolated chambers.

* * * * *